United States Patent
Nakasato et al.

(10) Patent No.: US 7,808,436 B2
(45) Date of Patent: Oct. 5, 2010

(54) FOLDING TYPE COMMUNICATION TERMINAL DEVICE

(75) Inventors: Mitsuharu Nakasato, Miyagi (JP); Hironori Kikuchi, Miyagi (JP); Satoru Watanabe, Kanagawa (JP)

(73) Assignee: Panasonic Corporation, Osaka (JP)

( * ) Notice: Subject to any disclaimer, the term of this patent is extended or adjusted under 35 U.S.C. 154(b) by 575 days.

(21) Appl. No.: 11/573,208

(22) PCT Filed: Aug. 9, 2005

(86) PCT No.: PCT/JP2005/014586

§ 371 (c)(1),
(2), (4) Date: Feb. 5, 2007

(87) PCT Pub. No.: WO2006/016585

PCT Pub. Date: Feb. 16, 2006

(65) Prior Publication Data

US 2008/0316113 A1 Dec. 25, 2008

(30) Foreign Application Priority Data

Aug. 10, 2004 (JP) ............................. 2004-233351

(51) Int. Cl.
*H01Q 1/24* (2006.01)
(52) U.S. Cl. .................. 343/702; 455/575.3; 455/575.7
(58) Field of Classification Search ................ 343/702, 343/841; 455/575.3, 575.7
See application file for complete search history.

(56) References Cited

U.S. PATENT DOCUMENTS 6,295,462 B1 * 9/2001 Kudoh ........................ 455/41.3
6,897,825 B2 5/2005 Kim et al.
6,952,187 B2 * 10/2005 Annamaa et al. ............ 343/702
7,228,112 B2 * 6/2007 Ota et al. .................... 455/90.3

(Continued)

FOREIGN PATENT DOCUMENTS

CN 1416194 A 5/2003

(Continued)

OTHER PUBLICATIONS

International Search Report dated Nov. 15, 2005.

(Continued)

*Primary Examiner*—Michael C Wimer
*Assistant Examiner*—Kyana R Robinson
(74) *Attorney, Agent, or Firm*—Pearne & Gordon LLP (57) ABSTRACT

In a communication terminal in which a first enclosure and a second enclosure are foldable, to provide the communication terminal with an antenna characteristic with a wide band performance in either when the enclosures are opened or folded. In a folding communication terminal comprising an upper enclosure 2 and a lower enclosure 3 which are foldable through a hinge, and an antenna 5 attached to the lower enclosure 3, the antenna 5 is arranged along the edge of the end face 3A on the upper side abutting on the hinge of the lower enclosure 3, a conductor is placed in the upper enclosure 2 not provided with the antenna, and a second printed board 31 is provided so that when the upper enclosure 2 and the lower enclosure 3 are opened, it is connected to the antenna 5 at a high frequency to operate as the antenna, thereby transmitting/receiving an electromagnetic wave.

8 Claims, 9 Drawing Sheets

U.S. PATENT DOCUMENTS

| | | |
|---|---|---|
| 2002/0080074 A1 | 6/2002 | Wang |
| 2003/0129950 A1 | 7/2003 | Kwak |
| 2003/0137459 A1 * | 7/2003 | Kim et al. .................. 343/702 |

FOREIGN PATENT DOCUMENTS

| | | | |
|---|---|---|---|
| EP | 1 424 747 | A1 | 6/2004 |
| EP | 1424747 | A1 * | 6/2004 |
| JP | 2001-136255 | A | 5/2001 |
| JP | 2004-072605 | A | 3/2004 |
| JP | 2004-120578 | A | 4/2004 |
| JP | 2004-236360 | A | 8/2004 |
| JP | 2005-057664 | A | 3/2005 |
| JP | 2005-124033 | A | 5/2005 |
| JP | 2005-130216 | A | 5/2005 |
| JP | 2005-136668 | A | 5/2005 |
| JP | 2005-295578 | A | 10/2005 |

OTHER PUBLICATIONS

Supplementary Partial European Search Report dated Sep. 28, 2009.

* cited by examiner

PRIOR ART

FIG. 14 (B)

PRIOR ART

FIG. 15

PRIOR ART

FOLDING TYPE COMMUNICATION TERMINAL DEVICE

TECHNICAL FIELD

This invention relates to a folding communication terminal such as a foldable cellular phone.

BACKGROUND ART

Figure 14:
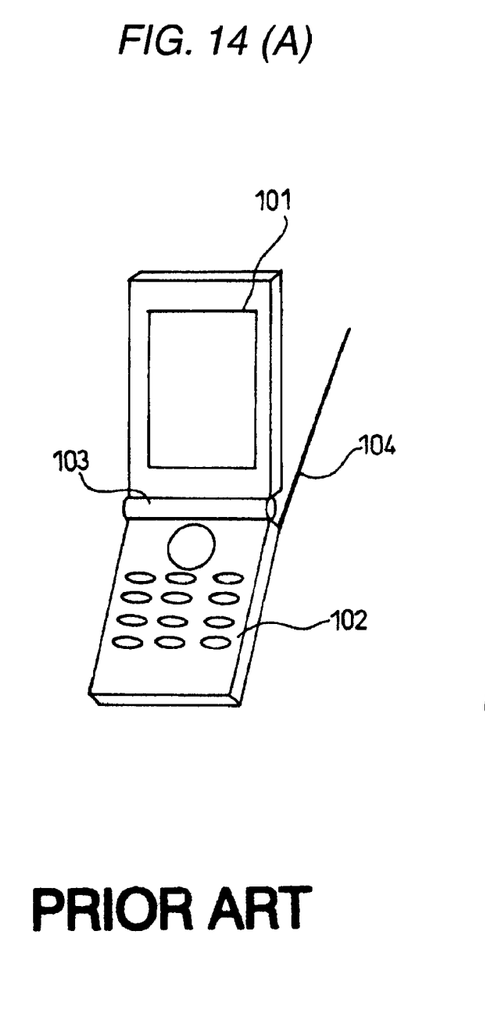

An example of conventional folding communication terminals is shown in FIG. 14. This folding communication terminal includes a first enclosure 101, a second enclosure 102 and a hinge 103 connecting the first and second enclosures 101, 102 to each other so that they are foldable. In this folding communication terminal, generally, the first enclosure 101 is provided with an antenna 104 as shown in FIG. 14(A), or otherwise the second enclosure 102 is provided with the antenna 104 as shown in FIG. 14(B).

Further, various antennas to be used in this folding communication terminal are known. For example, a pull-out whip antenna has the characteristic of a relatively wide band in the frequency band, but it is obstructive when pulled out. Further, a helical antenna is narrow in the frequency band and also protrusive so that it is not excellent in portability. On the other hand, although incorporated antennas such as an inverted F antenna are also known, they are also narrow in the frequency band.

Figure 15:
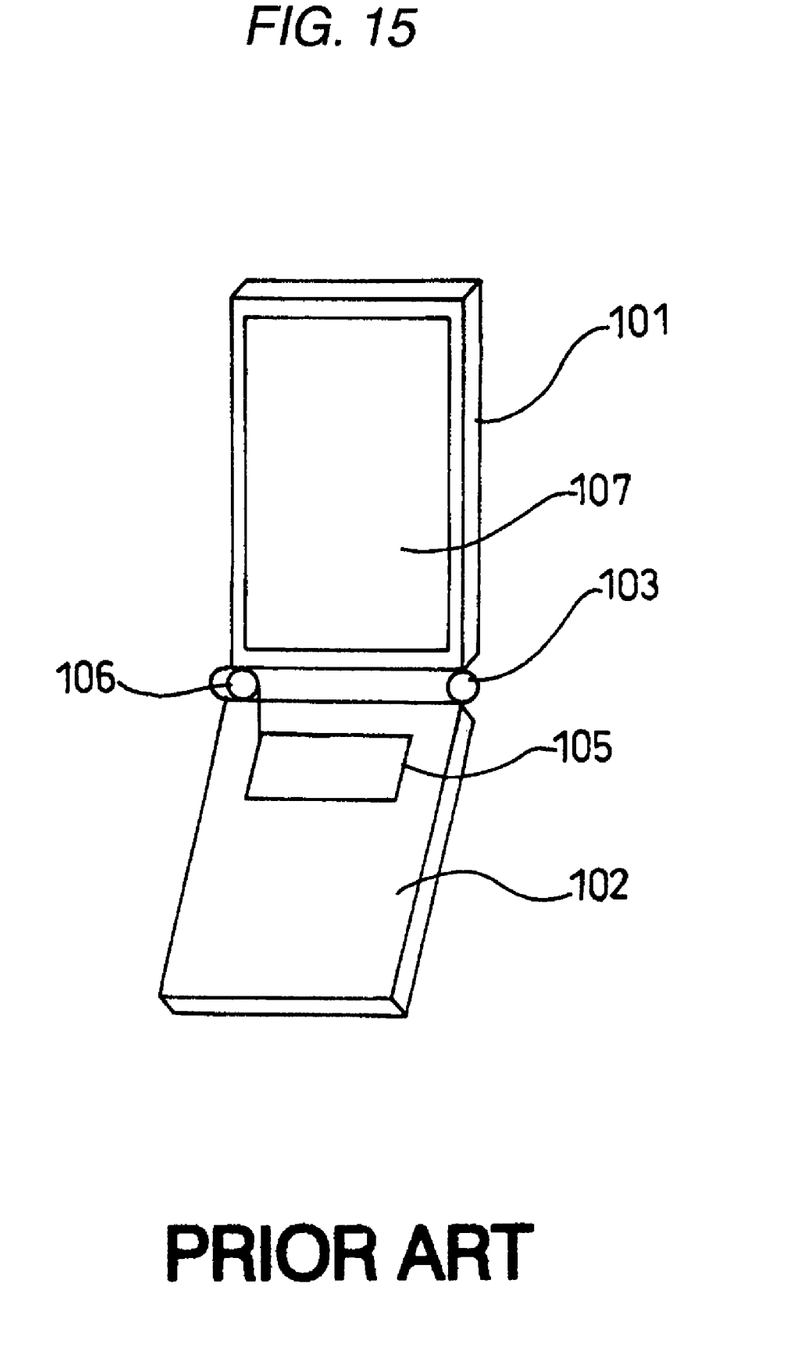
FIG. 15 is a perspective view of another conventional communication terminal.

In order to obviate such an inconvenience, a communication terminal has been developed in which as shown in FIG. 15, electric power is supplied from the second enclosure 102 equipped with a wireless portion 105 having a transmission/reception circuit to a plate-like element 107 incorporated within the first enclosure 101 through a power supply line or feeder 106 and the plate-like element 107 is used as the antenna (see for example Patent Reference 1).

Patent Reference 1: JP-A-2001-136255 (Page 5, FIG. 1)

DISCLOSURE OF THE INVENTION

Problems that the Invention is to Solve

Meanwhile, in the communication terminal provided with the antenna described in Patent Reference 1, when the plate-like element 107 incorporated within the first enclosure 101 is supplied with electric power, it serves as a mono-pole antenna with the second enclosure 102 being antenna ground. As a result, When the first and second enclosures 101, 102 are opened, the antenna has a wide frequency band characteristic, whereas when they are folded, the high frequency current flowing through the antenna (plate-like element 107) and that flowing through the antenna ground (second enclosure 102) cancel each other in their vectors, so that the plate-like element 107 does not operate as the antenna.

This invention has been accomplished in view of the above circumstances. An object of this invention is to provide a folding communication terminal which can exhibit an excellent antenna characteristic regardless of whether the first and second enclosures are opened or folded.

In a folding communication terminal comprising a first enclosure and a second enclosure which are foldable through a hinge and an antenna attached to either one of the first second enclosure and the second enclosure, the folding communication terminal according to this invention is characterized in that the antenna is arranged along one face abutting on the hinge of the either one enclosure, a conductor is placed in the enclosure not provided with the antenna of the first enclosure and the second enclosure; and when the first enclosure and the enclosure are opened, the antenna and the conductor are connected to each other at a high frequency to transmit/receive an electromagnetic wave. In accordance with such a configuration, when the first enclosure and the second enclosure are folded, the antenna supplied with power from a wireless portion operates. On the other hand, when the first enclosure and the second enclosure are opened, the conductor, e.g. a printed board, placed in the enclosure not provided with the antenna is excited by the antenna so as to operate as an antenna. Thus, either when the first enclosure and the second enclosure are opened or folded, the communication terminal with a preferable antenna characteristic can be provided.

Further, in a folding communication terminal comprising a first enclosure and a second enclosure which are foldable through a hinge and an antenna attached to either one of the first enclosure and the second enclosure, the folding communication terminal according to this invention is characterized in that the antenna is arranged along the edge of the face on the side opposite to the one face abutting on the hinge of the either one enclosure; a conductor is placed in the enclosure not provided with the antenna of the first enclosure and the second enclosure; and when the first enclosure and the second enclosure are folded, the antenna and the conductor are connected to each other at a high frequency to transmit/receive an electromagnetic wave.

In accordance with such a configuration, when the first enclosure and the second enclosure are opened, the antenna supplied with power from a wireless portion operates. On the other hand, when the first enclosure and the second enclosure are folded, the conductor, e.g. a printed board, placed in the enclosure not provided with the antenna is excited by the antenna so as to operate as an antenna. Thus, either when the first enclosure and the second enclosure are opened or folded, the communication terminal with a preferable antenna characteristic can be provided.

Further, in a folding communication terminal comprising a first enclosure and a second enclosure which are foldable through a hinge and an antenna attached to the hinge, the folding communication terminal according to this invention is characterized in that the antenna is arranged in the longitudinal direction of the hinge, a conductor is placed in the enclosure not provided with the antenna of the first enclosure and the second enclosure; and when the first enclosure and the second enclosure are opened or folded, the antenna and the conductor are connected to each other at a high frequency to transmit/receive an electromagnetic wave.

In accordance with such a configuration, either when the first enclosure and the second enclosure are opened or folded, the communication terminal with a preferable antenna characteristic can be provided.

In a folding communication terminal comprising a first enclosure and a second enclosure which are foldable through a hinge and a first antenna and a second antenna which are attached to the first enclosure and a second antenna, respectively, the folding communication terminal according to this invention is characterized in that the first antenna is arranged along the one face abutting on the hinge of the first enclosure; the second antenna has a size enough to be connected to the first antenna at a high frequency when the first enclosure and the second enclosure are opened; and a wireless portion electrically connected to the first antenna through a power supplying portion is placed within the first enclosure.

In accordance with such a configuration, when the first enclosure and the second enclosure are folded, the first antenna supplied with power from the wireless portion operates. On the other hand, when the first enclosure and the second enclosure are opened, the second antenna is excited by the first antenna so as to operate as an antenna. Thus, either when the first enclosure and the second enclosure are opened or folded, the communication terminal with a preferable antenna characteristic can be provided.

In a folding communication terminal comprising a first enclosure and a second enclosure which are foldable through a hinge and a first antenna and a second antenna which are attached to the first enclosure and a second enclosure, respectively, the folding communication terminal according to this invention is characterized in that the first antenna is arranged along the one face abutting on the hinge of the first enclosure; the second antenna has a size enough to be connected to the first antenna at a high frequency when the first enclosure and the second enclosure are folded; and a wireless portion electrically connected to the first antenna through a power supplying portion is placed within the first enclosure.

In accordance with such a configuration, when the first enclosure and the second enclosure are opened, the first antenna supplied with power from the wireless portion operates. On the other hand, when the first enclosure and the second enclosure are folded, the second antenna is excited by the first antenna so as to operate as an antenna. Thus, either when the first enclosure and the second enclosure are opened or folded, the communication terminal with a preferable antenna characteristic can be provided.

In accordance with this invention, in a folding communication terminal comprising a first enclosure and a second enclosure which are foldable through a hinge and an antenna attached to either one of the first enclosure and the second enclosure, the antenna is arranged along one face abutting on the hinge of the either one enclosure, a conductor is placed in the enclosure not provided with the antenna of the first enclosure and the second enclosure; and when the first enclosure and the second enclosure are opened, the antenna and the conductor are connected to each other at a high frequency to transmit/receive an electromagnetic wave.

When the first enclosure and the second enclosure are opened, the conductor is excited by the antenna so as to operate as an antenna. Thus, either when the first enclosure and the second enclosure are opened or folded, the communication terminal with a preferable antenna characteristic can be provided.

BRIEF DESCRIPTION OF THE DRAWINGS

FIG. 1 is a perspective view of a communication terminal according to the first embodiment of this invention; (A) shows the state where enclosures are opened and (B) shows the state where the enclosures are folded.

FIG. 2 is a back perspective view of a communication terminal according to the first embodiment of this invention; (A) shows the state where the enclosures are opened and (B) shows the state where the enclosures are folded.

FIG. 4 is a side view of a communication terminal according to a modification of the first embodiment of this invention; (A) shows the state where enclosures are opened and (B) shows the state where the enclosures are folded.

FIG. 6 is a side view of a communication terminal according to the second embodiment of this invention; (A) shows the state where the enclosures are opened and (B) shows the state where the enclosures are folded.

FIG. 7 is a side view of a communication terminal according to the second embodiment of this invention; (A) shows the state where the enclosures are opened and (B) shows the state where the enclosures are folded.

FIG. 8 is a perspective view of a communication terminal according to the third embodiment of this invention; (A) shows the state where the enclosures are opened and (B) shows the state where the enclosures are folded.

FIG. 9 is a side view of a communication terminal according to the third embodiment of this invention; (A) shows the state where the enclosures are opened and (B) shows the state where the enclosures are folded.

FIG. 10 is a side view of a communication terminal according to the third embodiment of this invention; (A) shows the state where the enclosures are opened and (B) shows the state where the enclosures are folded.

FIG. 11 is a perspective view of a communication terminal according to the fourth embodiment of this invention; (A) shows the state where the enclosures are opened and (B) shows the state where the enclosures are folded.

FIG. 12 is a side view of a communication terminal according to the fourth embodiment of this invention; (A) shows the state where the enclosures are opened and (B) shows the state where the enclosures are folded.

FIG. 13 is a perspective view of a communication terminal according to the fourth embodiment of this invention; (A) shows the state where enclosures are opened and (B) shows the state where the enclosures are folded.

FIG. 14 is a perspective view of a conventional communication terminal; (A) shows the type in which an upper enclosure is equipped with an antenna and (B) shows the type in which a lower enclosure is equipped with the antenna.

DESCRIPTION OF REFERENCE NUMERALS AND SIGNS 1A to 1H a communication terminal
2 an upper enclosure (first enclosure)
2A an end face on the upper side (plane abutting on a hinge)
21 a first printed board (conductor or antenna ground)
3 lower enclosure (second enclosure)
3A an end face on the upper part (plane abutting on a hinge)
31 a second printed board (conductor or antenna ground)
4 the hinge
5 a first antenna
6 a wireless portion
7 a second antenna
8 a power supplying portion

BEST MODE FOR CARRYING OUT THE INVENTION

Now referring to the attached drawings, a detailed explanation will be given of various embodiments of this invention.

Embodiment 1

Figure 1:
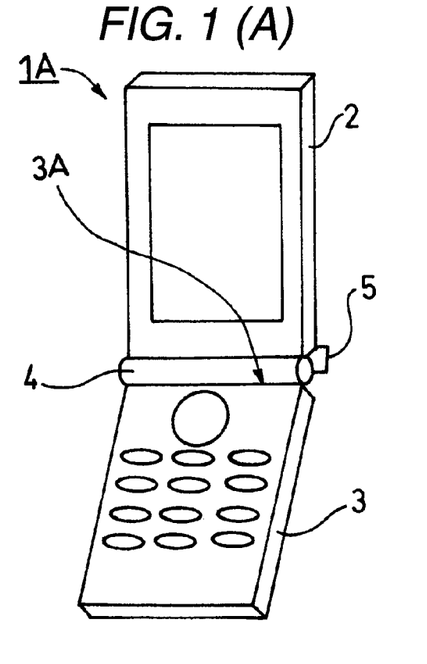
Figure 2:
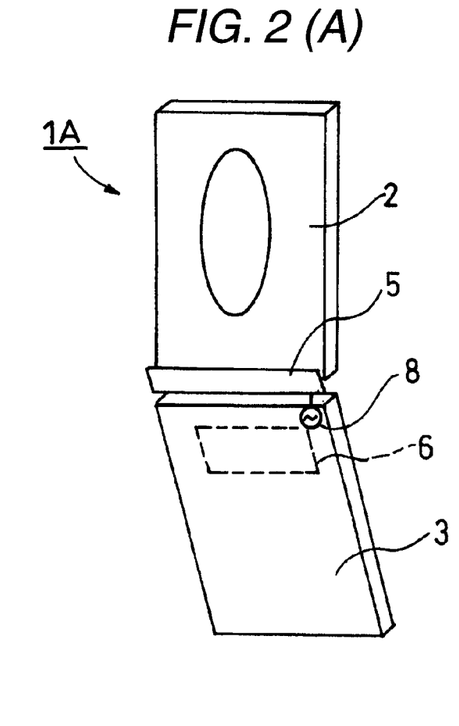

FIGS. 1 and 2 show a folding communication terminal 1A according to the first embodiment of this invention. The folding communication terminal 1A includes a square upper enclosure 2 that is a first enclosure, a square lower enclosure 3 that is a second enclosure, a hinge 4 connecting these upper and lower enclosures 2,3 to each other so that they are foldable (rotatable), and a first antenna 5.

Figure 3:
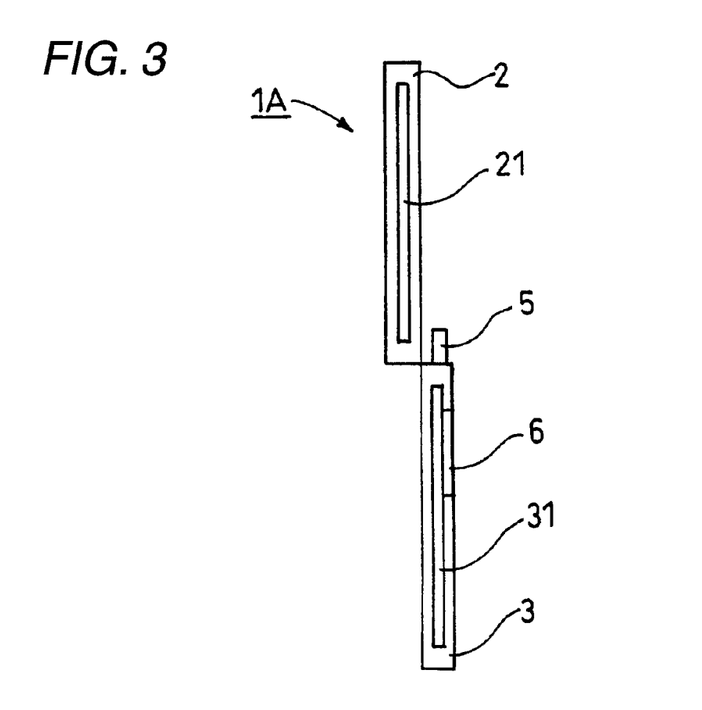
FIG. 3 is a side view of the communication terminal according to the first embodiment of this invention when the enclosure are opened.

Of these components, as shown in FIG. 3, in the upper enclosure 2, a first printed board 21 is arranged over the nearly entire area within the upper enclosure 2. On the other hand, in the lower enclosure 3, a second printed board 31 having a wireless portion 6 and a power supplying portion 8 as shown in FIG. 2 is placed over the entire area within the lower enclosure 3 as shown in FIG. 3. The wireless portion 6 is constructed of a transmission/reception circuit, and electrically connected to the first antenna 5 through the power supplying portion 8. The first antenna 5 has a rectangular shape, and is arranged in a state protruding along the end face (edge) 3A on the upper side facing the hinge 4 of the lower enclosure 3. Incidentally, the first antenna 5 may be arranged within the hinge 4 (in the longitudinal direction).

An explanation will be given of the operation of the folding communication terminal 1A constructed as described.

(I) Where the upper enclosure 2 and the lower enclosure 3 have been folded.

The first antenna 5, as shown in FIG. 2(B), is arranged along the end face (edge) 3A on the upper side facing the hinge 4 of the lower enclosure 3. The first antenna 5 is connected to the wireless portion 6 in the second printed board 31 (see FIG. 3) of the lower enclosure 3. In the state where the upper and lower enclosures 2 and 3 have been folded, the second printed board 31 serves as the antenna ground. Incidentally, where the upper and lower enclosures 2 and 3 have been folded, the first printed board 21 placed in the upper enclosure 2 is not arranged adjacently to the first antenna 5 so that they are not coupled with each other at a high frequency. In addition, since the first antenna 5 and antenna ground (second printed board 31) do not directly face each other, it is possible to prevent the vectors of the high frequency currents flowing through them from canceling each other.

(II) Where the upper enclosure 2 and the lower enclosure 3 have been opened.

On the other hand, where upper and lower enclosures 2 and 3 have been opened, as shown in FIG. 2(A), the first printed board 21 placed in the upper enclosure 2 becomes adjacent to the first antenna 5. Therefore the first antenna 5 and first printed board 21 are coupled with each other at the high frequency so that the first printed board 21 substantially operates as the antenna.

Figure 4:
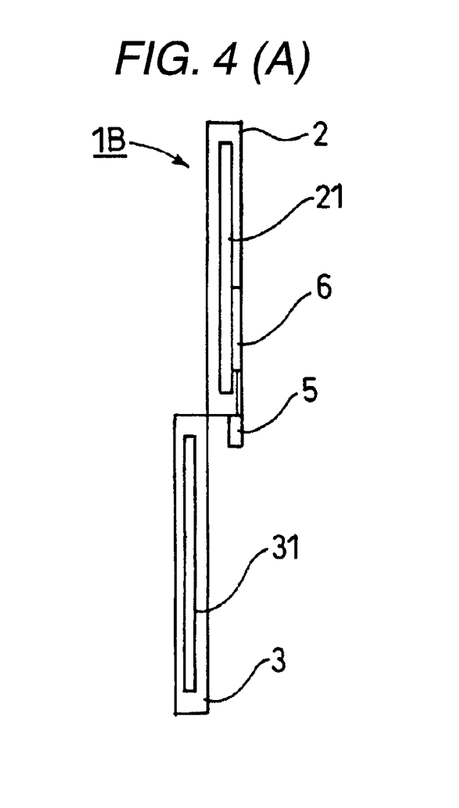

Incidentally, in this embodiment, the second printed board 31 having the wireless portion 6 is incorporated in the lower enclosure 3 and the wireless portion 6 is electrically connected to the first antenna 5. However, this invention should not be particularly limited to such a structure. For example, as shown in FIG. 4, in a folding communication terminal 1B, the first printed board 21 provided with the wireless portion 6 may be incorporated in the upper enclosure 2 and the wireless portion 6 may be electrically connected to the first antenna 5, thereby showing the same effect.

Embodiment 2

Next, an explanation will be given of a communication terminal according to the second embodiment of this invention. In this embodiment, like reference symbols refer to like parts in the first embodiment.

Figure 5:
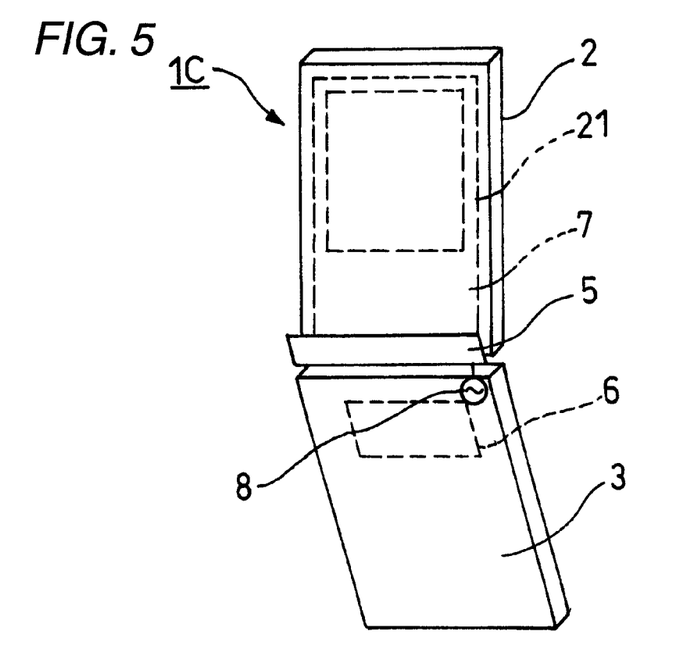
FIG. 5 is a perspective view of a communication terminal according to a second embodiment of this invention.
Figure 6:
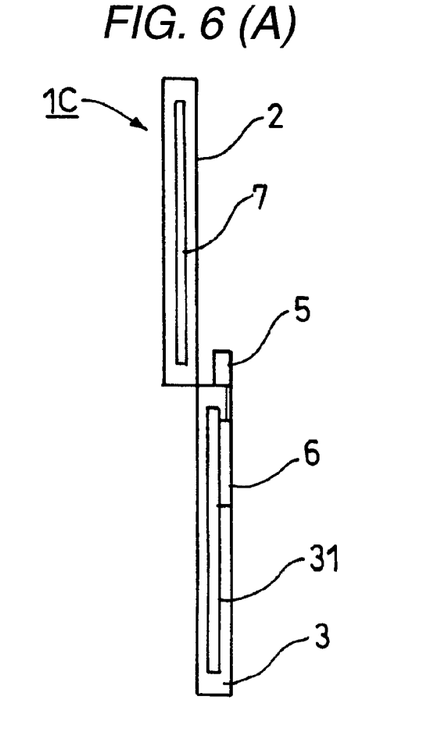

FIGS. 5 and 6 show a communication terminal 1C according to the second embodiment of this invention. In the communication terminal 1C, unlike the first embodiment, not only is protruded the first antenna 5 along the end face (edge) 3A on the upper side facing the hinge 4 of the lower enclosure 3, but also a second antenna 7 is placed on the first printed board 21 incorporated in the upper enclosure 2. Further, the second printed board 31 incorporated in the lower enclosure 3 is provided with the wireless portion 6 as in the first embodiment, and the wireless portion 6 is electrically connected to the first antenna 5. On the other hand, the second antenna 7 is formed with a larger size than the first printed board 21, and concretely arranged over the nearly entire area within the upper enclosure 2.

Now referring to FIG. 6, an explanation will be given of the operation of the communication terminal 1C constructed as described above.

(I) Where the upper enclosure 2 and the lower enclosure 3 have been opened.

In FIG. 6(A), the first antenna 5, as in the first embodiment, is arranged along the end face 3A (edge) on the upper side facing the hinge 4 of the lower enclosure 3 and also connected to the wireless portion 6 attached to the second printed board 31. Thus, the second printed board 31 incorporated in the lower enclosure 3 operates as the antenna ground. Incidentally, in the state where the upper and lower enclosures 2 and 3 have been folded, since the first antenna 5 and the antenna ground (second printed board 31) do not face each other, it is possible to prevent the vectors of the high frequency currents flowing through them from canceling each other.

(II) Where the upper enclosure 2 and the lower enclosure 3 have been folded.

Where the upper and lower enclosures 2,3 have been folded, as shown in FIG. 6(B), since the second antenna 7 placed in the upper enclosure 2 becomes adjacent to the first antenna 5, they are coupled with each other at the high frequency. And since the second antenna 7 has a higher radiant efficiency than the first antenna 5, the second antenna 7 operates as the antenna.

Figure 7:
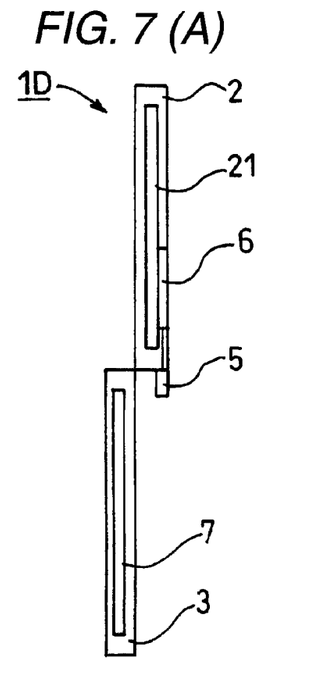

Incidentally, in this embodiment, the second printed board 31 having the wireless portion 6 is incorporated in the lower enclosure 3, and the wireless portion 6 is connected to the antenna 30. However, this invention should not be limited to such a construction. For example, as shown in FIG. 7, in a communication terminal 1D, the wireless portion 6 is placed in the first printed board 21 incorporated in the upper enclosure 2, and the second antenna 7 may be placed in the lower enclosure 3 and connected to the wireless portion 6, thereby showing the same effect.

Embodiment 3

Next, an explanation will be given of a communication terminal according to the third embodiment of this invention. Incidentally, in this embodiment, like reference symbols refer to like parts in the first embodiment.

Figure 8:
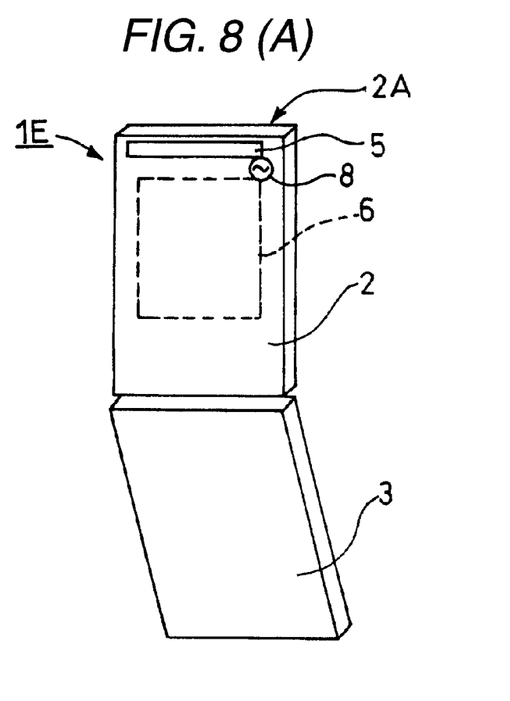
Figure 9:
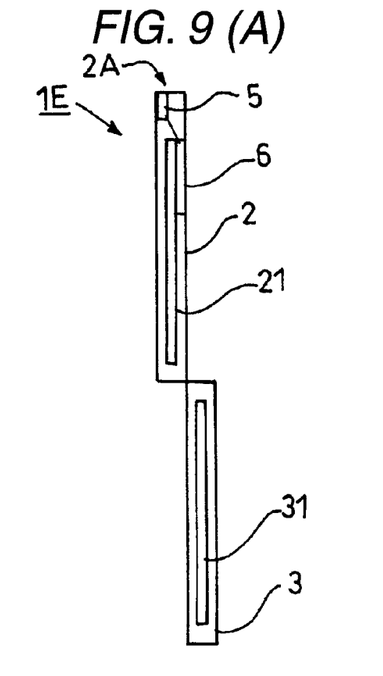

FIGS. 8 and 9 show a communication terminal 1E according to the third embodiment of this invention. In this communication terminal 1E, the first antenna 5 is arranged along an end face 2A(edge) on the upper side of the upper enclosure 2 and the wireless portion 6 is placed on the first printed board 21 incorporated in the upper enclosure 2. Incidentally, the lower enclosure 3 incorporates the second printed board 31 as in the first embodiment.

Referring to FIG. 9, an explanation will be given of the operation of the communication terminal 1E constructed as described above.

(I) Where the upper enclosure 2 and the lower enclosure 3 have been opened.

In FIG. 9(A), the first antenna 5, as described above, is arranged along the end face (end face 2A on the upper side) opposite to the end face (edge) on the lower side to which the hinge not shown is attached within the upper enclosure 2. and also electrically connected to the wireless portion 6 placed on the first printed board 21. Thus, the first printed board 21 incorporated in the upper enclosure 2 operates as the antenna ground.

(II) Where the upper enclosure 2 and the lower enclosure 3 have been folded.

Where the upper and lower enclosures 2,3 have been folded, as shown in FIG. 9(B), since the second printed board 31 placed in the lower enclosure 3 becomes adjacent to the first antenna 5, they are coupled with each other at the high frequency and the second printed board 31 operates as the antenna.

Figure 10:
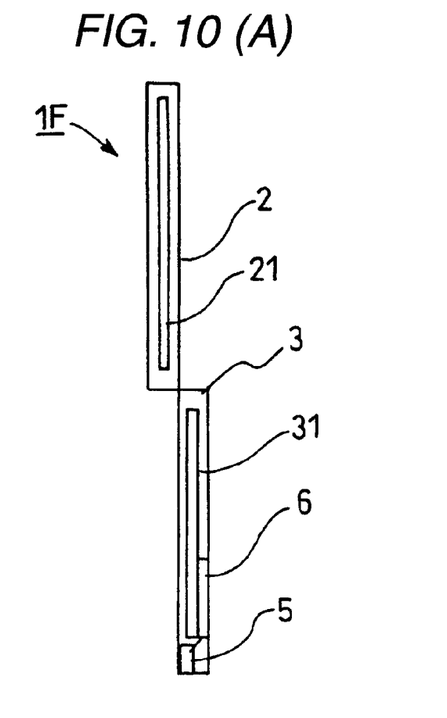

Incidentally, in this embodiment, the first antenna 5 is placed in the upper enclosure 2 and the first printed board 21 having the wireless portion 6 is incorporated in the upper enclosure 2, and the wireless portion 6 is electrically connected to the first antenna 5. However, this invention should not be limited to such a construction. For example, as shown in FIG. 10, in a communication terminal 1F, the first antenna 5 may be placed within the lower enclosure 3, and the wireless portion 6 may be attached to the second printed board 31 within the lower enclosure 3 and electrically connected to the first antenna 5, thereby giving the same effect.

Embodiment 4

Next, an explanation will be given of a communication terminal 1F according to the fourth embodiment of this invention. Incidentally, in this embodiment, like reference symbols refer to like parts in the first to third embodiments.

Figure 11:
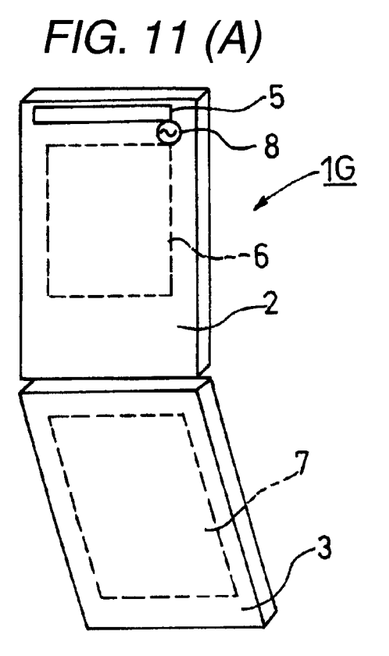
Figure 12:
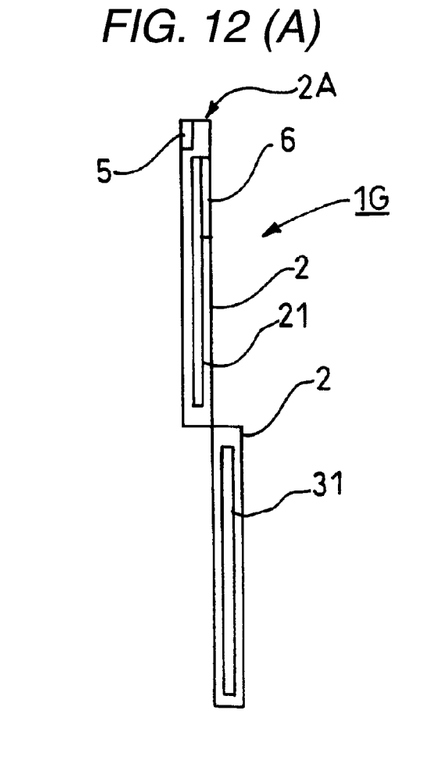

FIGS. 11 and 12 show a communication terminal 1G according to the fourth embodiment of this invention. In this communication terminal 1G, the first printed board 21 placed within the upper enclosure 2 is provided with the wireless portion 6 and first antenna 5; and the lower enclosure 3 incorporates the second printed board 31 and the second antenna 7. Among these components, the first antenna 5 is formed in a small-width shape along the end face 2A (edge) on the upper side within the upper enclosure 2 as in the third embodiment. On the other hand, the second antenna 7 is formed so as to have a size approximately equal to or larger than the second printed board 31 over the nearly entire area within the lower enclosure 3.

Referring to FIG. 12, an explanation will be given of the operation of the communication terminal 1G constructed as described above.

(I) Where the upper enclosure 2 and the lower enclosure 3 have been opened.

The first antenna 5, as shown in FIG. 12(A), is arranged along the other end face (end face 2A on the upper side) opposite to the end face on the one side to which the hinge not shown is attached within the upper enclosure 2. In addition, the first antenna 5 is electrically connected to the wireless portion 6 attached to the first printed board 21, Thus, the first printed board 21 incorporated in the upper enclosure 2 operates as the antenna ground.

(II) Where the upper enclosure 2 and the lower enclosure 3 have been folded.

Where the upper and lower enclosures 2 and 3 have been folded, as shown in FIG. 12(B), since the second antenna 7 placed in the lower enclosure 3, becomes adjacent to the first antenna they are coupled with each other at the high frequency. Thus, the second antenna 7 practically operates as the antenna of the communication terminal 1G.

Figure 13:
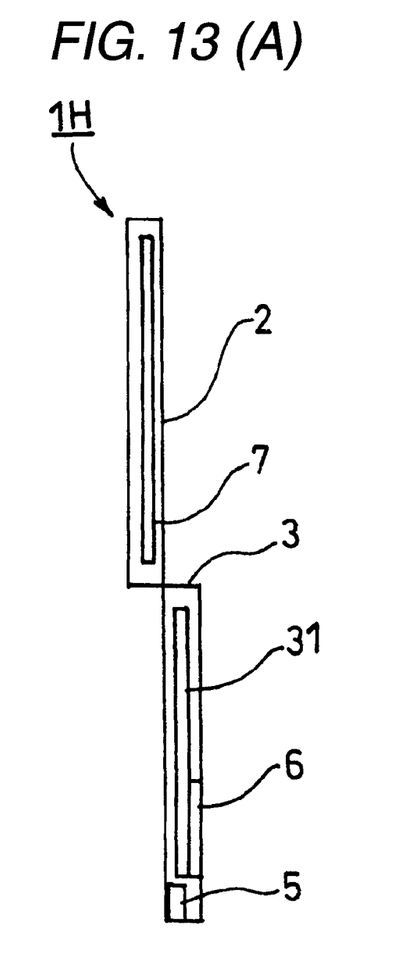

Additionally, in this embodiment, the upper enclosure 2 incorporates the wireless portion 6 and the first printed board 21 with the first antenna 5 which are connected to each other, whereas the lower enclosure 3 incorporates the second antenna 7. However, this invention should not be limited to such a configuration. For example, as shown in FIG. 13, the lower enclosure 3 of this communication terminal 1H may incorporate the second printed board 31 equipped with the wireless portion 6 and the first antenna 5 which are connected to each other, whereas the upper enclosure 2 may incorporate the second antenna 7. Such a configuration also presents the same effect.

Incidentally, this invention should not be limited to the embodiments described above, but can be realized in various manners within a scope departing from the spirit thereof.

Specifically, in the explanation hitherto made, the first antenna 5 was constructed of a monopole antenna, but may be constructed of other type antennas such as a whip antenna, helical antenna or incorporated antenna to obtain the same effect. Further, in the explanation hitherto made, a single antennal was arranged, but plural antennas may be arranged to obtain the same effect. Further, in the explanation hitherto made, the first antenna 5 and the wireless portion 6 were incorporated within the same enclosure, but they may be arranged within different enclosures to obtain the same effect. Further, in the explanation hitherto made, the second antenna 7 was constructed of the conductor incorporated in the enclosure, but the enclosure itself may be constructed of the conductor to obtain the same effect.

This invention was explained in detail and with reference to specific embodiments. However, it is apparent to those skilled in the art that this invention can be changed or modified without departing from the spirit and scope of the invention.

This application is based on Japanese Patent Application No. 2004-233351 filed in Aug. 10, 2005. The disclosure thereof is incorporated herein by reference,

INDUSTRIAL APPLICABILITY

In a folding communication terminal comprising a first enclosure and a second enclosure which are foldable through a hinge, and an antenna placed in either one of the first enclosure and the second enclosure, this invention provides a configuration in which the antenna is arranged along the edge of the one face facing the hinge of the either one enclosure, and a conductor is placed in the enclosure not provided with the antenna of the first enclosure and the second enclosure so that when the first enclosure and the second enclosure are opened, the conductor is connected to the antenna at a high frequency to transmit/receive an electromagnetic wave. Thus, the communication terminal according to this invention can provide a preferable antenna performance in either when the first and second enclosures are opened or folded and so is preferably applied to a small-sized portable communication terminal such as a cellular phone.

The invention claimed is:

1. A folding communication terminal having a mechanism in which a first enclosure and a second enclosure are coupled with each other by a hinge so as to be freely opened/closed, comprising:

an antenna attached to either one of said first enclosure and said second enclosure; and a conductor placed in the enclosure not provided with said antenna of either one of said first enclosure and said second enclosure;

wherein said antenna is arranged along the edge of the one face abutting on said hinge of said either one enclosure; and when said first enclosure and said second enclosure are opened, said antenna and said conductor are connected to each other at a high frequency so that said conductor substantially operates as an antenna to transmit/receive an electromagnetic wave, and when said first enclosure and said second enclosure are folded, said antenna and said conductor are not connected to each other at a high frequency.

2. The folding communication terminal according to claim 1, wherein said antenna is arranged on substantially the length of the edge of said either one enclosure.

3. A folding communication terminal having a mechanism in which a first enclosure and a second enclosure are coupled with each other by a hinge so as to be freely opened/closed, comprising:

an antenna attached either one of said first enclosure and said second enclosure; and a conductor placed in the enclosure not provided with said antenna of either one of said first enclosure and said second enclosure; and wherein said antenna is arranged on an edge of said either one enclosure not abutting on said hinge and opposite to an edge of said either one enclosure abutting on said hinge and when said first enclosure and said second enclosure are folded, said antenna and said conductor are connected to each other at a high frequency so that said conductor substantially operates as an antenna to transmit/receive an electromagnetic wave.

4. A folding communication terminal having a mechanism in which a first enclosure and a second enclosure are coupled with each other by a hinge so as to be freely opened/closed, comprising:

an antenna attached to said hinge; and a conductor placed in the enclosure not provided with said antenna of either one of said first enclosure and said second enclosure; and wherein said antenna is arranged in the longitudinal direction of said hinge; and when said first enclosure and said second enclosure are opened, said antenna and said conductor are connected to each other so that said conductor substantially operates as an antenna at a high frequency to transmit/receive an electromagnetic wave, when said first enclosure and said second enclosure are closed, said antenna and said conductor are not connected at the high frequency.

5. A folding communication terminal having a mechanism in which a first enclosure and a second enclosure are coupled with each other by a hinge so as to be freely opened/closed, comprising:

a first antenna, attached to said first enclosure;

a second antenna, attached to said second enclosure; and a wireless portion, placed within said first enclosure and electrically connected to said first antenna through a power supplying portion, wherein said first antenna is arranged along the one face abutting on said hinge of said first enclosure; and when said first enclosure and said second enclosure are opened, said second antenna has a size enough to be connected to said first antenna at a high frequency, said first antenna and said second antenna are connected to each other at the high frequency so that said second antenna substantially operates as an antenna to transmit/receive an electromagnetic wave, and when said first enclosure and said second enclosure are folded, said first antenna and said second antenna are not connected to each other at a high frequency.

6. The folding communication terminal according to claim 5, wherein said antenna is arranged on substantially the length of the edge of said either one enclosure.

7. A folding communication terminal having a mechanism in which a first enclosure and a second enclosure are coupled with each other by a hinge so as to be freely opened/closed, comprising:

a first antenna, attached to said first enclosure;

a second antenna, attached to said second enclosure; and a wireless portion, placed within said first enclosure and electrically connected to said first antenna through a power supplying portion;

wherein said first antenna is arranged along the one face abutting on said hinge of said first enclosure; and when said first enclosure and said second enclosure are folded, said second antenna has a size enough to be connected to said first antenna at a high frequency, said first antenna and said second antenna are connected to each other at the high frequency so that said second antenna substantially operates as an antenna to transmit/receive an electromagnetic wave, and when said first enclosure and said second enclosure are opened, said first antenna and said second antenna are not connected to each other at a high frequency.

8. The folding communication terminal according to claim 7, wherein said first antenna is arranged on substantially the length of the edge of said either one enclosure.

* * * * *

UNITED STATES PATENT AND TRADEMARK OFFICE
CERTIFICATE OF CORRECTION

| | | |
|---|---|---|
| PATENT NO. | : 7,808,436 B2 | |
| APPLICATION NO. | : 11/573208 | |
| DATED | : October 5, 2010 | |
| INVENTOR(S) | : Nakasato et al. | |

It is certified that error appears in the above-identified patent and that said Letters Patent is hereby corrected as shown below:

In column 7, line 67, please delete the ",", after the number "3" and before the word "becomes", In column 8, line 1, please insert the number --5-- after the word "antenna" and before the word "they".

Signed and Sealed this

Eleventh Day of January, 2011

David J. Kappos
*Director of the United States Patent and Trademark Office*